Patented May 16, 1950

2,507,631

UNITED STATES PATENT OFFICE 2,507,631

PYRIDINE AND PIPERIDINE COMPOUNDS AND PROCESS OF MAKING SAME

Max Hartmann and Leandro Panizzon, Riehen, Switzerland, assignors to Ciba Pharmaceutical Products Inc., Summit, N. J., a corporation of New Jersey No Drawing. Application March 9, 1945, Serial No. 581,971. In Switzerland January 19, 1944

Section 1, Public Law 690, August 8, 1946
Patent expires January 19, 1964

19 Claims. (Cl. 260—294)

According to this invention new pyridine and piperidine compounds are obtained by causing monoaryl-aceto-nitriles whose acetonitrile radical contains at least one hydrogen atom to react with nuclear halogenated pyridines and piperidines in the presence of agents eliminating hydrogen halide, if desired, replacing one hydrogen atom at the carbon atom linked to the nitrile group by an alkyl radical, transforming the nitrile group in the compounds thus obtained into the carboxyl group or into an ester or an amide group in one or several steps, if desired, converting the resulting pyridines into the corresponding piperidines by means of reducing agents and/or, if desired, further substituting the pyridine or piperidine compounds thus obtained at the ring nitrogen atom.

The monoaryl-acetonitrile used for the reaction may contain a substituent in the methylene group of the acetonitrile radical and one or several substituents in the aryl radical. Examples are: phenyl-acetonitrile, naphthyl-acetonitrile, α-phenyl-α-alkyl-acetonitriles, such as α-phenyl-α-methyl-acetonitrile, 3-methoxyphenyl-acetonitrile, 3:4-dimethoxyphenyl - acetonitrile, 3:4-methylene - dioxyphenyl - acetonitrile. Nuclear halogenated pyridines and piperidines are for example: 2-chloro-pyridine, 4-chloro-pyridine, 1-methyl-3-chloro-piperidine. These may also contain further substituents. Thus 2-chloro-5-nitro-pyridine may be used as starting material. The reaction is carried out preferably in inert solvents, such as for example, ether, benzene, toluene and the like. For the elimination of the hydrogen halide there are preferably used sodium, potassium, lithium as such or in the form of their amides, hydrides, alcoholates or hydrocarbon compounds, such as for example sodium amide, sodium hydride, potassium-tertiary butylate, potassium-tertiary amylate, butyl-lithium, phenyl-sodium or phenyl-lithium.

If acetonitriles are obtained in this reaction which still contain a hydrogen atom at the carbon atom linked with the nitrile group, this can be replaced by the corresponding alkyl radicals, for example by reaction with alkyl halides, such as methyl, ethyl or diethylamino-ethyl chloride in the presence of agents eliminating hydrogen halide.

The acids and their amides are produced from the α-aryl-α-pyridyl-acetonitriles or α-aryl-α-piperidyl-acetonitriles obtained by the reaction by the action of suitable hydrolyzing agents. The amides can also be produced from the acids or their derivatives such as halides by the reaction with ammonia or amines. The esters are obtained from the nitriles, acids or amides with corresponding esterifying agents, such alcohols or derivatives thereof being also useful which contain basic groups.

The pyridine carboxylic acids or their amides and esters obtained according to the present process can be converted into the corresponding piperidine compounds by the action of such reducing agents as are known for the hydrogenation of the pyridine nucleus.

The further substitution at the ring nitrogen atom of the pyridines and piperidines formed in the present process can take place in any stage of the reaction. The corresponding quaternary compounds can thus be produced for example by reaction with alkyl-halides, alkylene-halides, aryl-sulfonic acid esters, dialkyl-sulfates or also arylalkyl-halides. It is also possible to obtain tertiary piperidines by starting from piperidines which are not substituted at the ring nitrogen atom.

The compounds produced according to the present process possess valuable psysiological properties and are to be used as medicaments or as intermediate products for the preparation of medicaments.

The following example illustrates the invention, but are not to be regarded as limiting it in any way:

Example 80 grams of pulverized sodium amide are gradually added, while stirring and cooling, to a solution of 117 g. of phenyl-acetonitrile and 113 g. of 2-chloropyridine in 400 cc. of absolute toluene. The mixture is then slowly heated to 110–120° C. and maintained at this temperature for 1 hour. Water is added thereto after cooling, the toluene solution is shaken with dilute hydrochloric acid and the hydrochloric acid extracts are made alkaline with concentrated caustic soda solution. A solid mass is separated thereby which is taken up in acetic ester and distilled, α-phenyl-α-pyridyl-(2)-acetonitrile passing over at 150–155° C. under 0.5 mm. pressure. When recrystallized from ethyl acetate it melts at 88–89° C., the yield amounting to 135 g.

In similar manner there are obtained α-(3-methoxy-phenyl) - α -pyridyl-(2)-acetonitrile of melting point 54–55° C. when starting from 3-methoxyphenyl-acetonitrile and 2-chloropyridine, α-(3:4-dimethoxyphenyl) - α -pyridyl -(2)- acetonitrile of boiling point 192–195° C. under 0.2 mm. pressure when starting from 3:4-dimethoxyphenyl-acetonitrile and 2-chloropyridine, α-(3:4- methylene - dioxyphenyl) - α -pyridyl -(2) - acetonitrile of boiling point 170–180° C. under 0.15 mm. pressure when starting from 3:4-methylene-dioxyphenyl - acetonitrile and 2-chloropyridine, α-naphthyl -(1) -α - pyridyl -(2) - acetonitrile of melting point 87° C. when starting from naphthyl-(1)-acetonitrile and 2-chloropyridine, α-phenyl-α-methyl - α - pyridyl-(2) -acetonitrile of boiling point 145–150° C. under 0.2 mm. pressure when starting from α-phenyl-α-methylacetonitrile and 2-chloropyridine, α-phenyl-α-pyridyl-(4)-acetonitrile of melting point 76–77° C. when starting from phenyl-acetonitrile and 4-chloropyridine, α-phenyl-α-ethyl-α-pyridyl-(4)-acetonitrile of boiling point 193° C. under 11 mm. pressure when starting from α-phenyl-α-ethyl-acetonitrile and 4-chloropyridine, and α-phenyl-α-[N-methyl-piperidyl-(3)]-acetonitrile of boiling point 140–145° C. under 0.2 mm. pressure when starting from phenyl-acetonitrile and N-methyl-3-chloropiperidine.

The indicated α-phenyl- α -alkyl- α -pyridyl-acetonitriles can also be obtained by alkylation of α-phenyl-α-pyridyl-acetonitrile with the corresponding alkyl-halides in the presence of sodium amide.

100 g. of α-phenyl-α-pyridyl-(2)-acetonitrile are introduced into 400 cc. of concentrated sulfuric acid, allowed to stand overnight at room temperature, poured into ice and rendered alkaline with sodium carbonate. α-Phenyl-α-pyridyl-(2)-acetamide is precipitated thereby which melts at 134° C. after recrystallization from ethyl acetate. The yield amounts to 96 g. When treating this product on the water bath with dimethyl-sulfate in alcohol there is obtained the corresponding N-methyl-pyridinium-methosulfate of melting point 165° C. in good yield.

100 g. of the resulting α-phenyl-α-pyridyl-(2)-acetamide, when dissolved in 1 liter of methyl alcohol and treated for 6 hours at water-bath temperature with hydrogen chloride, and after concentrating, diluting with water and rendering alkaline with sodium carbonate, yield 90 g. of the α-phenyl-α-pyridyl-(2)-acetic acid methylester of melting point 74–75° C. (from alcohol of 50 per cent. strength). The corresponding α-phenyl-α-pyridyl-(2)-acetic acid ethylester of boiling point 155–160° C. under 0.4 mm. pressure is obtained in similar manner when carrying out the esterification in the presence of ethylalcohol.

These esters can also be obtained when subjecting directly the α-phenyl-α-pyridyl-(2)-acetonitrile dissolved in the respective alcohol, instead of the amide, to the same treatment with hydrogen chloride at water-bath temperature.

The α-phenyl-α-piperidyl-(2)-acetic acid methylester of boiling point 135–137° C. under 0.6 mm. pressure is obtained in theoretical yield by hydrogenation of 50 g. of α-phenyl-α-pyridyl-(2)-acetic acid methylester in glacial acetic acid in the presence of 1 g. of platinum catalyst at room temperature, while taking up 6 hydrogen atoms. The N-methyl derivative produced with formaldehyde and formic acid, boils at 153° C. under 0.4 mm. pressure.

α-Phenyl-α-piperidyl-(2)-acetic acid methylester is also obtained in the following manner: by hydrogenation of α-phenyl-α-pyridyl-(2)-acetamide, also with platinum catalyst, there is obtained the corresponding α-phenyl-α-piperidyl-(2)-acetamide whose acetate, when recrystallized from ethylacetate, melts at 158° C. By saponification with boiling hydrochloric acid this yields the α-phenyl-α-piperidyl-(2)-acetic acid-hydrochloride of decomposition point 248° C. The esterification with methyl alcohol yields the above named ester. The corresponding ethylester forms a hydrochloride of melting point 173° C. and an N-methyl derivative of boiling point 138–140° C. under 0.4 mm. pressure. The n-propylester yields a hydrochloride of melting point 181° C. and a N-methyl-derivative of boiling point 140° C. under 0.3 mm. pressure.

The following amides and esters have been produced in similar manner:

α-Phenyl-α-pyridyl-(4)-acetamide, of melting point 154° C.;

α-Phenyl-α-pyridyl-(2)-α-methyl-acetamide, of melting point 130° C.;

α - Phenyl - α - pyridyl-(2)-α-ethyl-acetamide, of melting point 108° C.;

α - Phenyl-α-piperidyl-(2)-α-ethyl-acetamide, of melting point 151–152° C.;

α-Phenyl-α-pyridyl-(4)-acetic acid methylester of boiling point 150° C. under 0.2 mm. pressure;

α-Phenyl-α-piperidyl-(4)-acetic acid methylester of boiling point 145° C. under 0.2 mm. pressure;

α - Phenyl - α - N-methylpiperidyl-(4)-acetic acid methylester of melting point 63° C.;

α - Phenyl - α-pyridyl-(2)-acetic acid-β-diethyl-aminoethylester of boiling point 160–163° under 0.2 mm. pressure;

α - Phenyl-α-piperidyl-(2)-acetic acid-β-diethyl-aminoethylester-hydrochloride of melting point 170° C.

Instead of the N-methyl-derivatives other N-alkyl-derivatives may be obtained, for instance with ethylbromide, alkylchloride and other alkylating agents.

What we claim is:

1. A compound of the formula

wherein Ar stands for a member selected from the group consisting of monocyclic aryl and condensed bicyclic aryl, X represents a member selected from the group consisting of hydrogen and lower alkyl, Pe stands for a member selected from the group consisting of pyridine and piperidine radicals a nuclear carbon atom of which is directly connected with C, and R stands for a member selected from the group consisting of the nitrile group and esterified and amidated carboxyl groups.

2. A compound of the formula

wherein Ar stands for phenyl, X represents a member selected from the group consisting of hydrogen and lower alkyl, Pe stands for a member selected from the group consisting of pyridine and piperidine radicals a nuclear carbon atom of which is directly connected with C and R stands for a member selected from the group consisting of the nitrile group, esterified and amidated carboxyl groups.

3. α-Phenyl-α-pyridyl-acetic acid esters.

4. α-Phenyl-α-pyridyl-(2)-acetic acid esters.

5. The α - phenyl - α-pyridyl-(2)-acetic acid methylester.

6. α-Phenyl-α-piperidyl-acetic acid esters.

7. α-Phenyl-α-piperidyl-(2)-acetic acid esters.

8. The α-phenyl-α-piperidyl-(2)-acetic acid methylester.

9. A process for the manufacture of a member selected from the group consisting of pyridine and piperidine compounds, comprising treating a monoaryl-aceto-nitrile whose aceto-nitrile radical contains at least one hydrogen atom with a member selected from the group consisting of nuclear halogenated pyridines and piperidines in the presence of an agent eliminating hydrogen halide.

10. A process for the manufacture of a member selected from the group consisting of pyridine and piperidine compounds, comprising treating a monophenyl-aceto-nitrile whose aceto-nitrile radical contains at least one hydrogen atom with a member selected from the group consisting of nuclear halogenated pyridines and piperidines in the presence of an agent eliminating hydrogen halide.

11. A process according to claim 10, wherein the reaction is carried out in the presence of sodium amide.

12. A process according to claim 9, wherein the nitrile group of the obtained α-aryl-α-pyridyl-aceto-nitrile is converted into an ester group as additional step.

13. A process according to claim 10, wherein the nitrile group of the obtained α-phenyl-α-pyridyl-aceto-nitrile is converted into an ester group as additional step.

14. A process according to claim 9, wherein the nitrile of the obtained α-aryl-α-pyridyl-acetonitrile is converted into an ester group and the thus obtained ester is treated with hydrogen in the presence of a catalyst of the platinum group as additional steps.

15. A process according to claim 9, wherein the nitrile of the obtained α-phenyl-α-pyridyl-acetonitrile is converted into an ester group and the thus obtained ester is treated with hydrogen in the presence of a catalyst of the platinum group as additional steps.

16. A process for the manufacture of α-phenyl-α-pyridyl-(2)-acetic acid methyl ester, comprising treating α-phenyl-α-pyridyl-(2)-acetonitrile with methylalcohol in the presence of water and hydrogen chloride.

17. A process for the manufacture of α-phenyl-α-piperidyl-(2)-acetic acid methylester, comprising treating α-phenyl-α-pyridyl-(2)-acetic acid methylester with hydrogen in the presence of platinum catalyst.

18. α-Phenyl-α-[N-alkyl-piperidyl-(2)]-acetic acid esters.

19. α-Phenyl-α-[N-methyl-piperidyl-(2)]-acetic acid methylester.

MAX HARTMANN.
LEANDRO PANIZZON.

REFERENCES CITED

The following references are of record in the file of this patent:

UNITED STATES PATENTS

| Number | Name | Date |
|---|---|---|
| 2,268,108 | Collie | Dec. 30, 1941 |

FOREIGN PATENTS

| Number | Country | Date |
|---|---|---|
| 710,227 | Germany | 1941 |
| 552,065 | Great Britain | 1943 |

OTHER REFERENCES

Whitmore: J. Amer. Chem. Soc., May 1944, pp. 725–731.